United States Patent
Shim

(10) Patent No.: US 9,723,087 B2
(45) Date of Patent: Aug. 1, 2017

(54) USER PRIVACY MANAGEMENT APPARATUS AND METHOD IN MOBILE COMMUNICATIONS SYSTEM

(75) Inventor: Dong-Hee Shim, Seoul (KR)

(73) Assignee: LG Electronics Inc., Seoul (KR)

( * ) Notice: Subject to any disclaimer, the term of this patent is extended or adjusted under 35 U.S.C. 154(b) by 1921 days.

(21) Appl. No.: 11/198,665

(22) Filed: Aug. 5, 2005

(65) Prior Publication Data

US 2006/0036680 A1 Feb. 16, 2006

(30) Foreign Application Priority Data

Aug. 6, 2004 (KR) .......................... 10-2004-0062144
Oct. 26, 2004 (KR) .......................... 10-2004-0085958

(51) Int. Cl.
*G06F 15/16* (2006.01)
*H04L 29/08* (2006.01)
*H04W 4/02* (2009.01)

(52) U.S. Cl.
CPC .............. *H04L 67/18* (2013.01); *H04W 4/02* (2013.01)

(58) Field of Classification Search
CPC ........................................................ H04W 4/02
USPC ....................................................... 709/203
See application file for complete search history.

(56) References Cited

U.S. PATENT DOCUMENTS

| 6,311,069 B1 | 10/2001 | Havinis et al. | |
| 6,463,289 B1 | 10/2002 | Havinis et al. | |
| 7,421,277 B2 * | 9/2008 | Burroughs | 455/456.2 |
| 2002/0077116 A1 * | 6/2002 | Havinis et al. | 455/456 |
| 2003/0023726 A1 * | 1/2003 | Rice et al. | 709/225 |
| 2003/0153310 A1 * | 8/2003 | Ishii | 455/435 |

(Continued)

FOREIGN PATENT DOCUMENTS

| CN | 1437827 | 8/2003 |
| CN | 1491060 | 4/2004 |

(Continued)

OTHER PUBLICATIONS

Ake Busin et al., Ericsson, Henric Mattsson, Ericsson; "SUPL Interface Efficiency" Doc# OMA-LOC-2004-0074-LATE-SUPL_Interface_Efficiency; Submitted to LOC WG; Mar. 2004.

(Continued)

*Primary Examiner* — Kevin Mai
(74) *Attorney, Agent, or Firm* — Lee, Hong, Degerman, Kang & Waimey PC

(57) ABSTRACT

Provided is a user privacy management apparatus and method on a Secure User Plane Location (SUPL) network including a SUPL Location Platform (SLP) and a SUPL Enabled Terminal (SET) and performing privacy authorization according to location of the SET, wherein when the location of the SET is calculated, the SLP (or SUPL Positioning Center (SPC) within the SLP) checks a privacy setup according to the calculated location, thereafter queries to a SET user whether to execute the privacy setup using a SUPL INIT message or a SUPL NOTIFICATION message, and then executes the privacy setup according to queries and responses transmitted through a SUPL START message or a SUPL NOTIFICATION RESPONSE message, whereby a user privacy can be managed more stably by notifying a user of the privacy setup according to the location of the user for reconfirmation.

6 Claims, 6 Drawing Sheets

(56) References Cited

U.S. PATENT DOCUMENTS

| | | |
|---|---|---|
| 2003/0153330 A1 | 8/2003 | Naghian |
| 2004/0127229 A1* | 7/2004 | Ishii .......................... 455/456.1 |
| 2004/0224702 A1 | 11/2004 | Chaskar |
| 2005/0250516 A1 | 11/2005 | Shim |
| 2006/0036680 A1 | 2/2006 | Shim |
| 2006/0258371 A1 | 11/2006 | Krishnamurthi et al. |
| 2007/0077939 A1 | 4/2007 | Uematsu et al. |
| 2007/0182547 A1 | 8/2007 | Wachter et al. |
| 2007/0293215 A1 | 12/2007 | Dawson |
| 2007/0293239 A1 | 12/2007 | Dawson et al. |
| 2007/0298793 A1 | 12/2007 | Dawson |
| 2008/0014962 A1 | 1/2008 | Shim |
| 2008/0070572 A1 | 3/2008 | Shkedi |

FOREIGN PATENT DOCUMENTS

| | | |
|---|---|---|
| KR | 10-2003-0056266 A | 7/2003 |
| KR | 2003-0056266 | 7/2003 |
| KR | 10-2003-0068474 | 8/2003 |
| RU | 2000121562 | 7/2002 |
| RU | 2001111839 | 6/2003 |
| WO | 02067089 | 8/2002 |
| WO | 03/032662 | 4/2003 |
| WO | 03/045099 | 5/2003 |

OTHER PUBLICATIONS

Open Mobile Alliance, Ltd., "Secure User Plane Location Architecture," Draft Version 1.0, Feb. 23, 2004, Doc. No. OMA-LOC_SUPL_AD-V1_0-20040223-D, XP-002484690.

* cited by examiner

FIG.2

FIG.3

| Parameter name | Status | Description |
|---|---|---|
| msid | M | Identity of the target subscriber |
| Lcs_external_id | M | LCS Client external ID-E.164 number. Identifies the application |
| serviceid | O | Identifies the service |
| servicetype | O | Indicates the category of service |
| session | O | Identifies the CS or PS session between the terminal and application |
| requestor | O | Identifies the mobile subscriber requesting the location based service |
| codeword | O | Identity of the requesting subscriber |
| reqtype | M | Immediate/Deferred location request |
| roaming | M | Indication whether the subscriber is roaming or not |
| servingnode | M | Address of the serving node-E.164 number |
| LocationEstimate | O | Current location of the target subscriber |

USER PRIVACY MANAGEMENT APPARATUS AND METHOD IN MOBILE COMMUNICATIONS SYSTEM

CROSS-REFERENCE TO RELATED APPLICATIONS

Pursuant to 35 U.S.C. §119(a), this application claims the benefit of earlier filing date and right of priority to Korean Application Nos. 10-2004-0062144, filed on Aug. 6, 2004, and 10-2004-0085958, filed on Oct. 26, 2004, the contents of which are all hereby incorporated by reference herein in their entirety.

BACKGROUND OF THE INVENTION

1. Field of the Invention

The present invention relates to a privacy service in a mobile communications system, and particularly, to a privacy management apparatus and method based upon a user location for a Secure User Plane Location (SUPL) network.

2. Background of the Related Art

In general, in order to provide location services to a user, considerable signaling and location information should be transferred between a mobile terminal and a location server. The so-called "positioning technologies" that have been standardized for providing such location services, for instance, a location service based upon the location (position) of a mobile device, are undergoing rapid widespread dissemination.

The positioning technologies can be provided through a user plane and a control plane. A Secure User Plane Location (SUPL) protocol of the Open Mobile Alliance (OMA), which is well-known as an example of the positioning technologies, provides the location services through the user plane.

The SUPL protocol is an efficient method for transferring location information required for the location calculation of a mobile station. The SUPL protocol employs a user plane data bearer so as to transfer positioning assistance information such as Global Positioning System (GPS) assistance, and to carry positioning technology associated protocols between the mobile terminal and a network.

In general, a SUPL network for providing the location services includes a SUPL agent, SUPL Location Platform (SLP) and SUPL Enabled Terminal (SET).

The SUPL agent refers to a logical service access point using location information which is actually measured. The SLP refers to a SUPL service access point at a network portion where network resources are accessed to obtain location information. The SET refers to a device for communicating with the SUPL network, for instance, a User Equipment (UE) of the UMTS, a Mobile Station (MS) of GSM, a IS-95 MS, or the like. The SET supports various procedures defined by the SUPL protocol by being connected to the network through the user plane bearer.

However, in a SUPL network structure, only the functions of each SUPL device have been suggested thus far, while a signal transfer system between each SUPL device for transferring location information is still being discussed. In particular, various privacy authorization (management) services according to a user location and a condition establishment have not yet been provided.

BREIF DESCRIPTION OF THE INVENTION

Therefore, an object of the present invention is to provide a user privacy management apparatus and method based on users' locations.

According to another object of the present invention, there is provided a user privacy management apparatus and method in which when a third party requests positioning of a specific user, a user can check whether to transmit the positioning of the corresponding user.

According to still another object of the present invention, there is provided a user privacy management apparatus and method capable of allowing a user to check application of each privacy rule when different privacy rules are adapted according to locations of users.

According to yet another object of the present invention, there is provided a user privacy management apparatus and method in which a SUPL ILocation Platform (SLP) for managing calculation of a location is divided into a SUPL Location Center (SLC) and the SUPL Positioning Center (SPC) and thus a location calculating process can be performed by directly connecting a SUPL Enabled Terminal (SET) and the SPC.

To achieve these and other advantages and in accordance with the purpose of the present invention, as embodied and broadly described herein, there is provided a user privacy management method in a mobile communications system in which an application of a location server calculates a location of a terminal according to requirements of a client, the method comprising: calculating the location of the terminal when the client requests positioning; checking whether information provision for the client is granted for the calculated location according to a setup information of the terminal; and selectively reporting the location of the terminal to the client according to the checked result.

Preferably, the setup information indicates whether to grant permission for the information provision previously registered by a terminal user, and is set differently according to the location of the terminal and the client which requests positioning.

In the user privacy management method, the reporting step comprises: reporting the location of the terminal immediately to the client when the agent is always granted for the information provision on a current location of the terminal; notifying the terminal user of the positioning request of the client when the agent is conditionally granted for the information provision on the current location of the terminal; and reporting the location of the terminal to the client when the terminal user transmits a positive response for reporting the location of the terminal.

Preferably, the notification is performed using a session initialization message or a session notification message.

Preferably, the notification is performed through a session for calculating the location of the terminal or another new session.

In the user privacy management method, the checking process can be performed by requesting to an external Privacy Checking Entity (PCE) whether an agent is granted for the information provision on the calculated location. Also, the checking process can be performed by receiving setup information of the target terminal from the PCE and directly checking whether the client is granted for the information provision on the calculated location.

To achieve these and other advantages and in accordance with the purpose of the present invention, a user privacy management apparatus on a Secure User Plane Location (SUPL) network for performing privacy authorization according to a location of a terminal comprises: a SUPL location platform (SLP) for checking whether information provision for a client is granted for a current location of a SUPL enable terminal (SET) according to privacy information of the SET when the client requests the positioning, and selectively reporting the location of the SET to the client; and the SET for providing a response of a user to the SLP when the SLP queries whether to grant permission for the information provision according to the checked result.

Preferably, the privacy information indicates whether to grant permission for the information provision previously registered by a SET user, and is set differently according to the location of the SET and the client which requests the positioning.

Preferably, the SLP queries whether to grant permission for the information provision using a specific message when the positioning is conditionally granted according to users.

Preferably, the specific message is a session initialization message for initializing a SUPL session with the SET or a session notification message for querying information provision to the SET user.

Preferably, the SLP transmits a location privacy assertion request message to an external privacy checking entity and requests the checked result or privacy information.

Preferably, the SLP includes a SUPL Positioning Center (SPC) for exchanging messages directly with the SET and calculating the location of the SET, and a SUPL Location Center for performing other functions except the function of calculating the location of the SET.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 2 illustrates a location privacy checking service which a SLP performs with a SPE (i.e., Privacy Checking Entity);

FIG. 3 illustrates a format of a location privacy assertion request message according to the present invention;

DETAILED DESCRIPTION OF THE INVENTION

Figure 1:
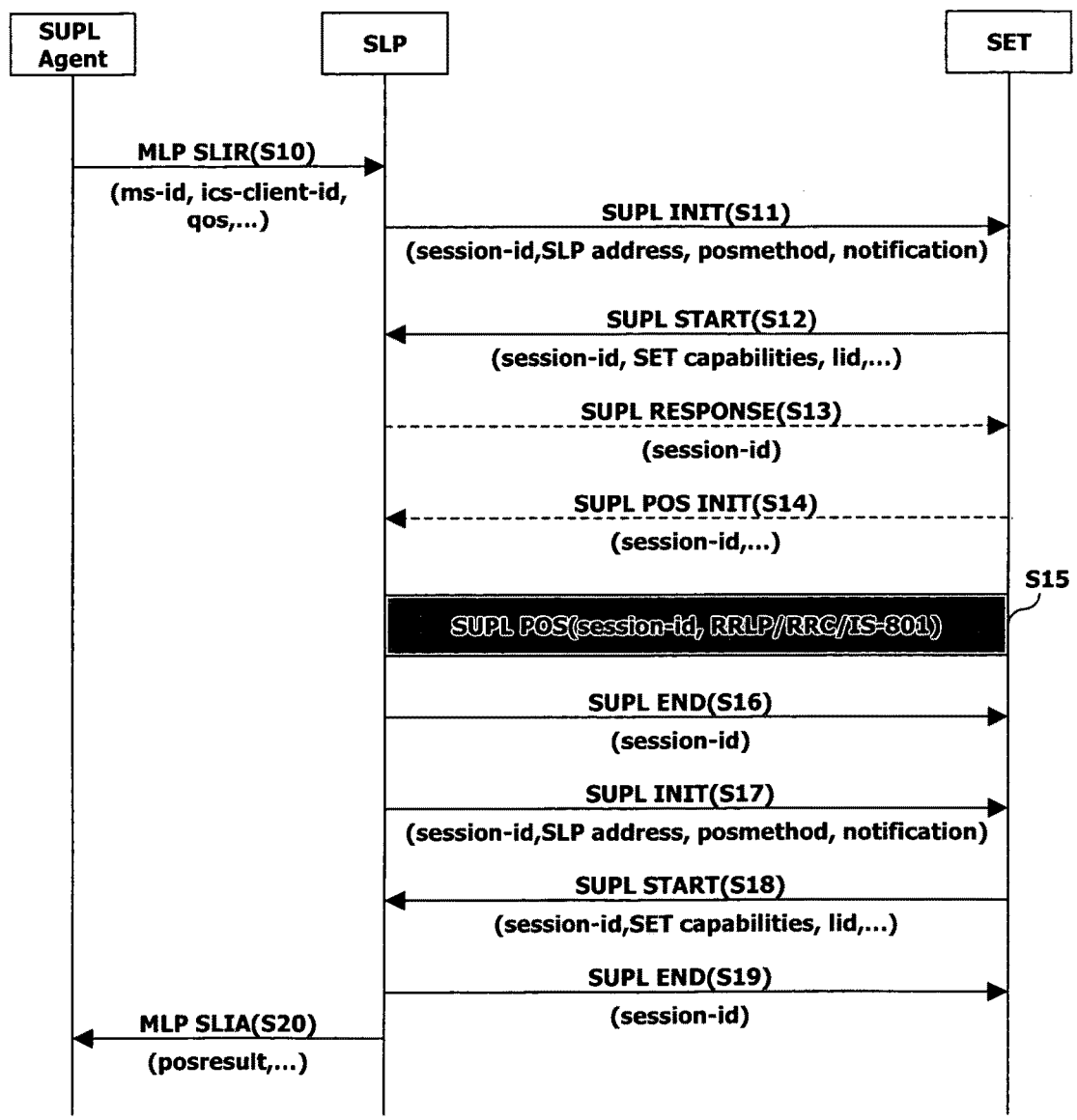
FIG. 1 illustrates a first embodiment of a user privacy management method in a mobile communications system according to the present invention.

The present invention may be implemented for a SUPL network. However, the present invention may be applicable to radio (wireless) communications systems which are operated according to other specifications. Hereinafter, reference will now be made in detail to the preferred embodiments of the present invention, examples of which are illustrated in the accompanying drawings.

Many users desire that different privacy policies be applied according to the current locations of their terminals. That is, a user may want to receive a positioning request (attempt) notification based on a current location of his terminal so as to restrict the accessing of location information. For instance, a user can grant permission to a third party for positioning of his terminal when at home, but may require positioning request (attempt) notification be performed when he is at work in his office. Therefore, the terminal user can grant or deny the positioning request made by the third party when the terminal user is physically located within an area defined by his user privacy profile. Thus, various privacy rules may be applied differently according to the user who requests positioning and a location of the SET (e.g., home, office, etc.) in a mobile communications system, such as a SUPL network. Therefore, if the SET is located within a specific area, before the location of the SET is reported to a user who requests positioning, an appropriate privacy checking procedure is performed according to the corresponding user and the location of the SET. Preferably, the SET, being a device capable of communicating with the SUPL network, may be one of a User Equipment (UE) for UMTS, a Mobile Station (MS) for GSM, a IS-95 MS or the like. In the present invention, the SET will also be simply referred to as a terminal.

The present invention proposes a user privacy management apparatus and method by which, when a third party (i.e., a client system) requests the positioning of a SET, an application (i.e., a server system) notifies a positioning request to the SET user so as to obtain reporting authorization, and thereafter transmits the position of the SET to the third party.

It may also be possible for a target SET to authorize positioning attempts after the target SET is notified of a positioning request, and the target SET then grants permission for positioning. It shall also be possible to make the notification conditional on the current location of the target SET. In this case, the notification shall be performed after the target SET is positioned, but before reporting the location of the target SET to a LCS (location services) client. This notification condition (i.e., notification with privacy verification) shall be specified in the Target UE Subscription Profile.

It shall be possible for location services to support conditional reporting if the target SET is within specific geographical areas. Under these conditions, an application that grants conditional positioning authorization must notify and obtain positioning authorization from the user of the target SET, after the positioning process is performed but before reporting the location of the target SET to the LCS client.

If the target subscriber notification is set as "notification with verification", each positioning request from the LCS Client or the service shall be notified to the target SET before positioning. If the target subscriber notification is set as "notification with verification based on current location", positioning requests from the LCS client or the service shall be notified to the target SET after positioning is performed if the current location of the target SET is within the areas specified to require notification. The treatment for location request from the LCS client or service, which is not registered in a privacy exception list, shall also be specified in the privacy exception list. An empty privacy exception list shall signify an intent to withhold the location from all LCS Clients.

In the user privacy management apparatus according to the present invention, when the LCS client requests positioning of the target SET, a SUPL Location Platform (SLP) calculates the location of the target SET. After completing his calculation, the SLP confirms the privacy information of the target SET with an external Privacy Checking Entity (PCE), and then transmits the location of the target SET to the LCS client immediately or after obtaining a reporting authorization of the SET user.

The PCE is connected to the SLP, and may include privacy information according to regions and users who request positioning as shown in the following Table 1.

TABLE 1

| No. | User | Region | Grant |
| --- | --- | --- | --- |
| Case 1 | A | | Always granted |
| Case 2 | B | | Conditionally granted |
| Case 3 | C | I | Always granted |
| Case 4 | C | II | Conditionally granted |

Referring to [Table 1], in the PCE, as can be noted in case 1 and case 2, an information provisioning can be set differently according to users (A or B) who request positioning of the SET, while, as can be noted in case 3 and case 4 information provisioning can be set differently according to regions (I and II) for a single user (C). Here, the information provisioning indicates reporting a location of the target client (SET or UE) to the LCS client (or SUPL agent).

The privacy information shown in [Table 1] is just exemplary, and thus, various other types of privacy information may be included therein.

Hereinafter, a user privacy management method in a user privacy management apparatus of a mobile communications system according to the present invention will now be explained more detail.

In general, SUPL location services may be classified into a network-initiated service and a SET-initiated service.

FIG. 1 illustrates a user privacy management method according to the present invention, whereby a SUPL call flow for an immediate positioning attempt by a network is shown. Here, the SLP corresponds to a network side and the SET corresponds to a terminal side.

Referring to FIG. 1, when the LCS client requests positioning of the SET to a SUPL agent within the network, the SUPL agent transfers the positioning request of the LCS client to the SLP using a Mobile Location Protocol (MLP) Standard Location Immediate Request (SLIR) message (S10). The MLP SLIR message can include ms-id, ics-client-id, QoS, and the like.

Based upon the received Ics-client-id, the SLP checks whether the SUPL agent is authorized for location services, and performs a subscriber privacy checking for the LCS client on the basis of the ms-id and the Ics-client-id.

In other words, as illustrated in FIG. 2, the SLP transmits a location privacy assertion request message to an external Privacy Checking Entity (PCE), and thus requests the PCE to check whether the LCS client is a user who has been authorized for positioning (i.e., location tracking) by using the privacy information (S30). FIG. 3 shows a location privacy assertion request message format. If the LCS client is a positioning-granted user (i.e., a user who has allowed location tracking to be performed thereon), the location privacy assertion request message does not includes a "locationEstimate" parameter.

Afterwards, when a decision as to whether permission for positioning should be granted or not is confirmed through a location privacy assertion response message (S31), the SLP checks whether the SET supports the SUPL protocol. Thereafter, the SLP transmits a session initialization message (SUPL INIT message) to initiate a SUPL session with the SET (S11).

At this time, as shown in [Table 1], because the privacy information of case 1 and case 2 are set according to the users, the SLP does not include notification components within the SUPL INIT message when the positioning of the SET is always granted to the user, such as user A. Conversely, when the positioning of the SET is conditionally granted to a user, such as user B, the SLP includes the notification components within the SUPL INIT message for transmission, to thereby query to the SET as to whether the location of the SET is to be transmitted to the LCS client (i.e., user B). Also, the SUPL INIT message can include a session id, a SLP address, a location measuring method (posmethod), and the like.

When the SUPL INIT message is received from the SLP and if notification components are included therein, the SET includes positioning authorization of the SET user for the positioning request in a session start message (SUPL START message), and thereafter starts the SUPL session with the SLP (S12). The SUPL START message includes at least a session-id, SET capabilities, and location identifier (lid). The SET capabilities include location-measuring methods that can be supported (e.g., MS assist A-GPS and MS based A-GPS, and cell-id method) and associated location-measuring protocols (e.g., RRLP, RRC, and IS-801). The SET capabilities can additionally include SUPL Extended flow elements, such as Reduced Flow, Extended Flow, and Both Flows. In addition, the SET may further provide NMR for radio (wireless) technologies to be used (e.g., GSM: TA, and RXLEV).

When the SUPL START message is received from the SET, the SLP examines the SUPL START message and determines which location-measuring protocol (e.g., RRLP, RRC, and IS-801) is to be used. If the SET capability included in the SUPL START message indicates the Extended Flow and the SLP supports the Extended Flow, the SLP sends a SUPL RESPONSE message to the SET. However, if the SET capability indicates the Extended Flow, but the SLP does not support the Extended Flow, the SLP transmits a SUPL END message to the SET to thusly transfer an appropriate error indication to the SET.

If the SET capability indicates the Extended Flow, the SLP transmits a SUPL POS message including an initial message to the SET to start the positioning process. Conversely, the SET capability indicates Both Flows in the SUPL START message, the SLP transmits a SUPL RESPONSE message or determines whether to start the positioning process.

If the SLP determines to use the Extended Flow on the basis of its capability and the SET capability, the SLP transmits the SUPL REPONSE message to the SET (S13). When the SUPL REPONSE message is received, the SET transmits a SUPL POS INIT message to the SLP (S14). At this time, the SET can include a first SUPL POS element in the SUPL POS INIT message. That is, the SLP notifies the SET of its capability through the SUPL RESPONSE message, and the SET transmits the SUPL POS INIT message to thusly allow the SLP to initiate the positioning protocol session.

Therefore, when the SUPL START message or the SUPL POS INIT message from the SET is inputted, the SLP starts the SUPL positioning process and calculates a current location of the SET (S15). In this case, the SLP or the SET can sequentially exchange SUPL positioning process messages (e.g., RRLP/RRC/TIA-801) several times using the SUPL POS message. Here, the SLP can calculate the location of the SET by receiving measurements from the SET (MS Assisted), or the SET can directly calculate its location using assistance obtained from the SLP (MS Based). If the SET directly calculates its location, the location can be calculated by a location sensor installed within the SET (e.g., a location calculating unit by GPS or Cell-id).

Upon calculating the location of the SET by the SUPL positioning process, the SLP transmits the SUPL END message to the SET to notify the termination of the SUPL session (S16). Also, the SLP transmits the location privacy assertion request message to the external PCE, and thus requests the PCE to check whether the LCS client is a user whose positioning is granted based on the calculated location of the SET (S30). In this case, the location privacy assertion request message may include a 'locationEstimate' parameter. Afterwards, if it is confirmed whether the positioning is granted through the location privacy assertion response message (S31), the SLP queries to the SET user as to whether the location of the SET should be transmitted to the LCS client according to the confirmation result (S17).

Therefore, for the positioning request from user A and user B (case 1 and case 2), the SLP transmits, via a MLP Standard Location Immediate Answer (SLIA) message, the location of the SET to the corresponding LCS client (user A or user B) immediately after positioning according to the confirmation result of the PCE. At this time, the SET releases all resources associated with the SUPL session.

However, as shown in [Table 1], the condition information, namely, privacy information for the user C has been differently set on the basis of region I and region II (case 3 and case 4). Therefore, according to the confirmation result of the PCE, the SLP transmits the current location of the SET to the user C who has requested the positioning. For instance, because the positioning by the user C in region I is set as 'always granted', the SLP transfers the location of the SET immediately to the SUPL agent without any reporting authorization of the SET user when the location of the SET is calculated.

Conversely, because the positioning by user C in region II is set as 'conditionally granted', the SLP queries to the SET user once again as to whether to transmit the location of the SET to user C when the location of the SET is calculated. At this time, contents queried to the user are transmitted through the notification components of the SUPL INIT message.

In another embodiment of the present invention, the SLP transmits the location privacy assertion request message to the external PCE after the step S10, such that the privacy information itself can be requested. In this case, the PCE transmits the privacy information of the SET to the SLP through the location privacy assertion response message. Therefore, the SLP uses the privacy information without transmitting the location privacy assertion request message back to the PCE, so as to facilitate the checking of whether to grant permission for positioning of the LCS client based on the location of the SET.

Accordingly, when the SUPL START message including the reporting authorization is transmitted from the SET in response to the SUPL INIT message (S18), if the SET user grants permission for transmissions of the positioning resultant value (i.e., the calculated current location of the SET), the SLP transmits the SUPL END message to the SET (S19), and transmits the MLP SLIA message including the location of the SET to the SUPL agent, so that the current location of the SET can be transferred to the LCS client (S20).

As aforementioned, in the present invention, when the privacy authorization is based on the location of the SET according to the privacy information stored in the PCE (case 4), the SLP, as described in the step S17, transmits the SUPL INIT message so as to ask the SET user once again as to whether the location of the SET should be transmitted.

However, as illustrated in FIG. 1, when the SLP queries to the SET user again as to whether the location of the SET should be transmitted, because all the resources of the SET have already been released by the SUPL END message, the SLP should re-allocate the radio (wireless) resources by transmitting the SUPL INIT message. Therefore, in case that the privacy authorization is based on the current location of a target user, as illustrated in FIG. 1, because the radio resources should be re-allocated using the SUPL INIT message, a time delay and waste of radio resources may occur.

Figure 4:
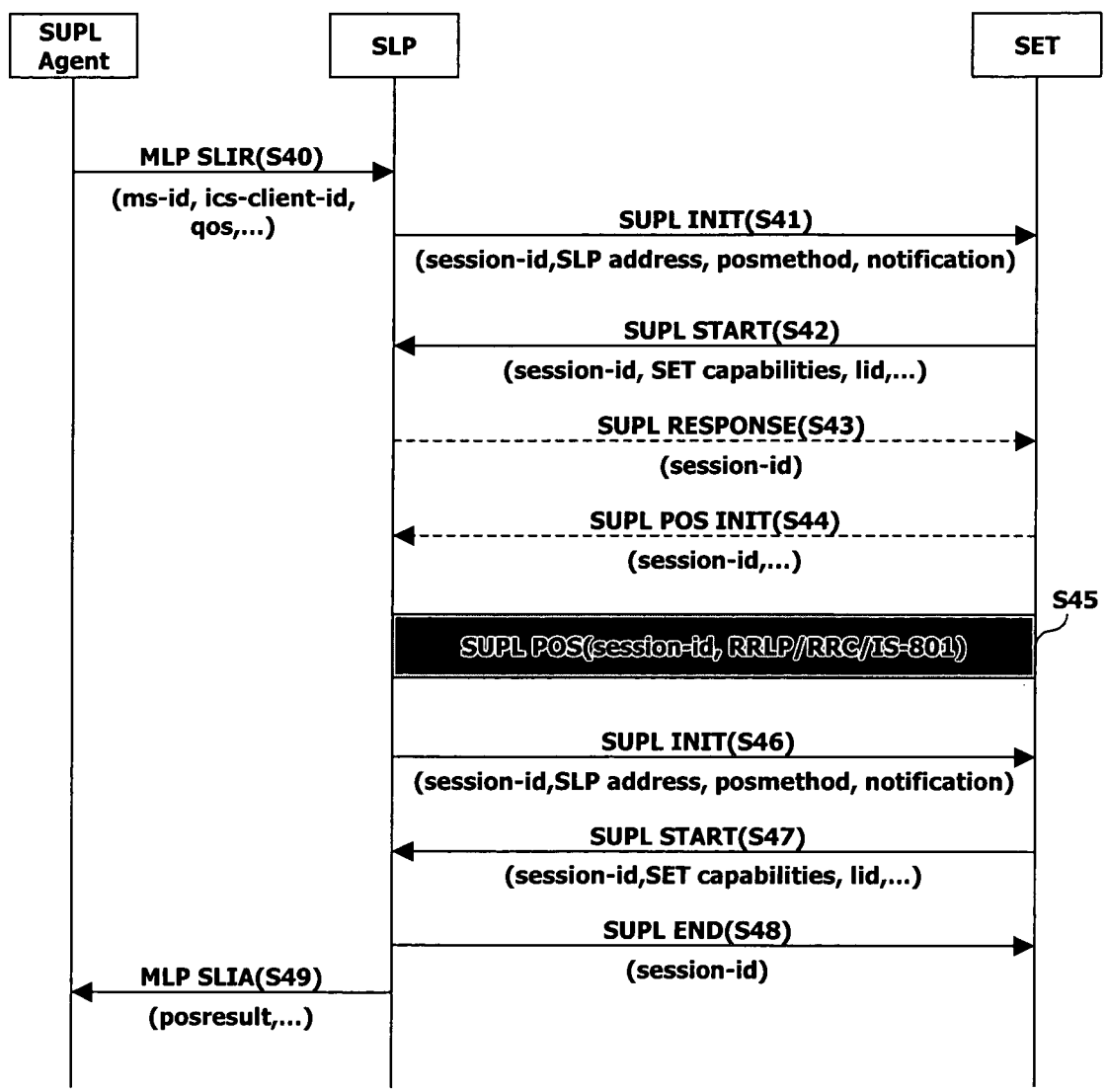
FIG. 4 illustrates a second embodiment of a user privacy management method in a mobile communications system according to the present invention.

Therefore, in a user privacy management method according to a second embodiment of the present invention, as illustrated in FIG. 4, if the transmission of the location of the SET for a specific region is set as 'conditionally granted' (case 4), the SLP transmits the SUPL INIT message to the SET immediately after the SUPL positioning process (S45), and thusly queries to the SET user as to whether the location of the SET should be transmitted (S46). Afterwards, when the SLP obtains the reporting authorization from the SET user through the SUPL START message, the SLP transmits the SUPL END message to the SET. As a result, the SLP releases all resources associated with the SUPL session (S47 and S48), thus, the SLP transmits to the SUPL agent, the positioning resultant value, namely, the MLP SLIA message including the current location of the SET (S49). For all other portions in FIG. 4, which are similar to those shown in FIG. 1, detailed explanations therefor have been omitted to prevent the differences between FIGS. 1 and 4 from being obscured.

Meanwhile, as illustrated in FIGS. 1 and 4, in the present invention, a new dedicated message can be used instead of re-using the SUPL INIT message in order to query the user who has requested an additional notification, namely, asking whether or not the positioning resultant value (the current location of the SET) should be transmitted.

Figure 5:
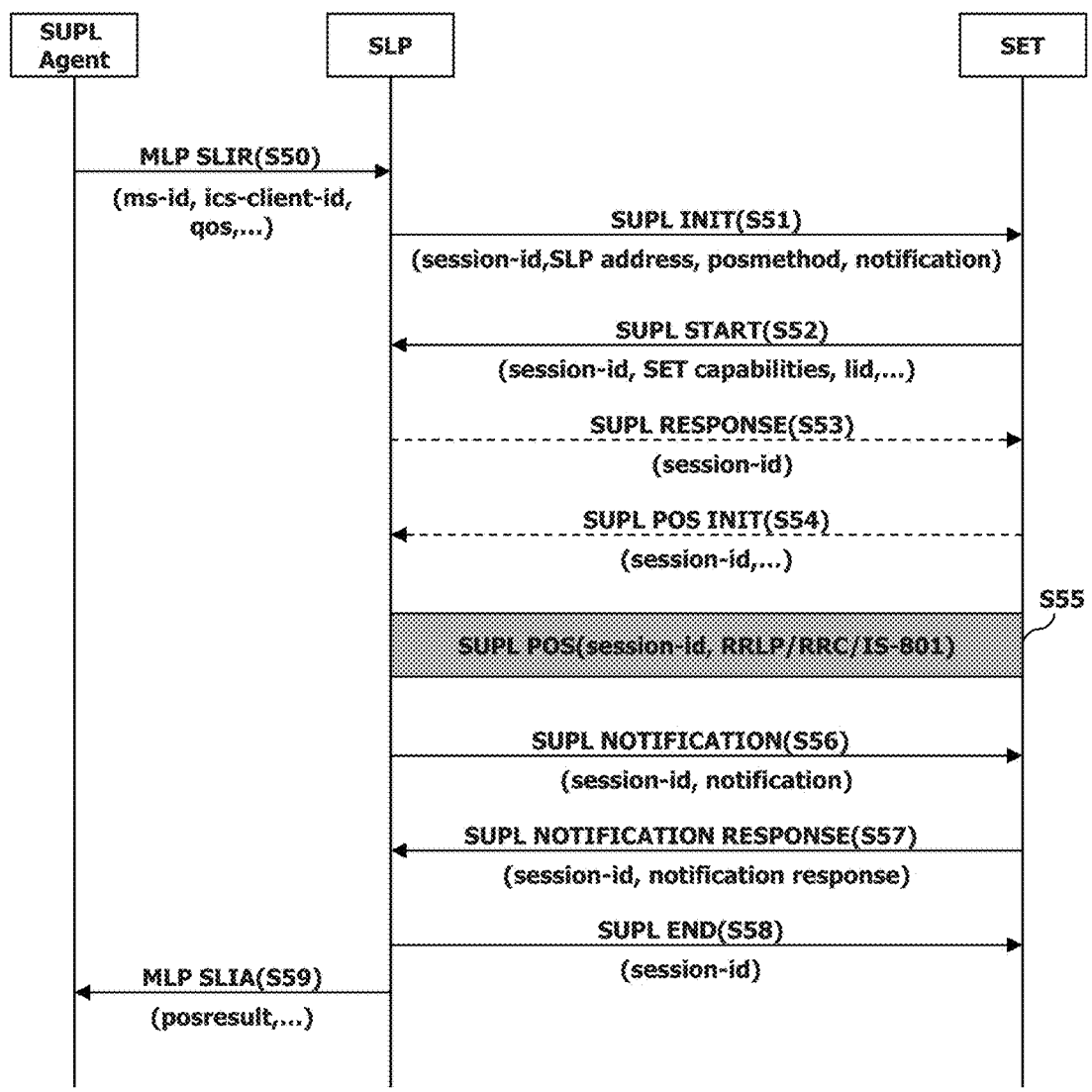
FIG. 5 illustrates a third embodiment of a user privacy management method in a mobile communications system according to the present invention.

FIG. 5 illustrates a user privacy management method in a mobile communications system according to a third embodiment of the present invention, in which the SET user is queried about whether the positioning resultant value should be transmitted by using a new dedicated message. Preferably, the dedicated message is a session notification (SUPL NOTIFICATION) message.

Referring to FIG. 5, in the third embodiment of the present invention, for an additional notification, a SUPL NOTIFICATION message and a SUPL NOTIFICATION RESPONSE message are used instead of the SUPL INIT and SUPL START messages. For all other portions in FIG. 5, which are similar to those shown in FIG. 4, detailed explanations therefor have been omitted to prevent the differences between FIGS. 4 and 5 from being obscured.

The SLP can know whether to grant permission for positioning of user C (case 4) having requested for positioning on the basis of the confirmation result transmitted from the PCE or privacy information having received from the PCE. As a result, when the SUPL positioning process (S55) is terminated, the SLP transmits the SUPL NOTIFICATION message to the SET when the SET is located in region II, and thus queries the SET user once again as to whether the current location of the SET is to be transmitted to user C (S56). At this time, the SUPL NOTIFICATION message may include only a session-id and the notification components. Here, contents queried to the user are transmitted through the notification components of a SUPL NOTIFICATION RESPONSE message.

The SET transmits the SUPL NOTIFICATION RESPONSE message, including the reporting authorization of the user, in response to the SUPL NOTIFICATION (S57). The SLP recognizes the intention of the user from the corresponding SUPL NOTIFICATION RESPONSE message and thereafter transmits the SUPL END message to the SET. As a result, the SLP notifies the SET that the positioning process is not to be initiated any more and that the SUPL session has been terminated (S58). Also, the SLP transmits the MLP SLIA message, including the calculated location information of the SET, to the SUPL agent (S59). Therefore, the SET releases all resources associated with the SUPL session.

Figure 6:
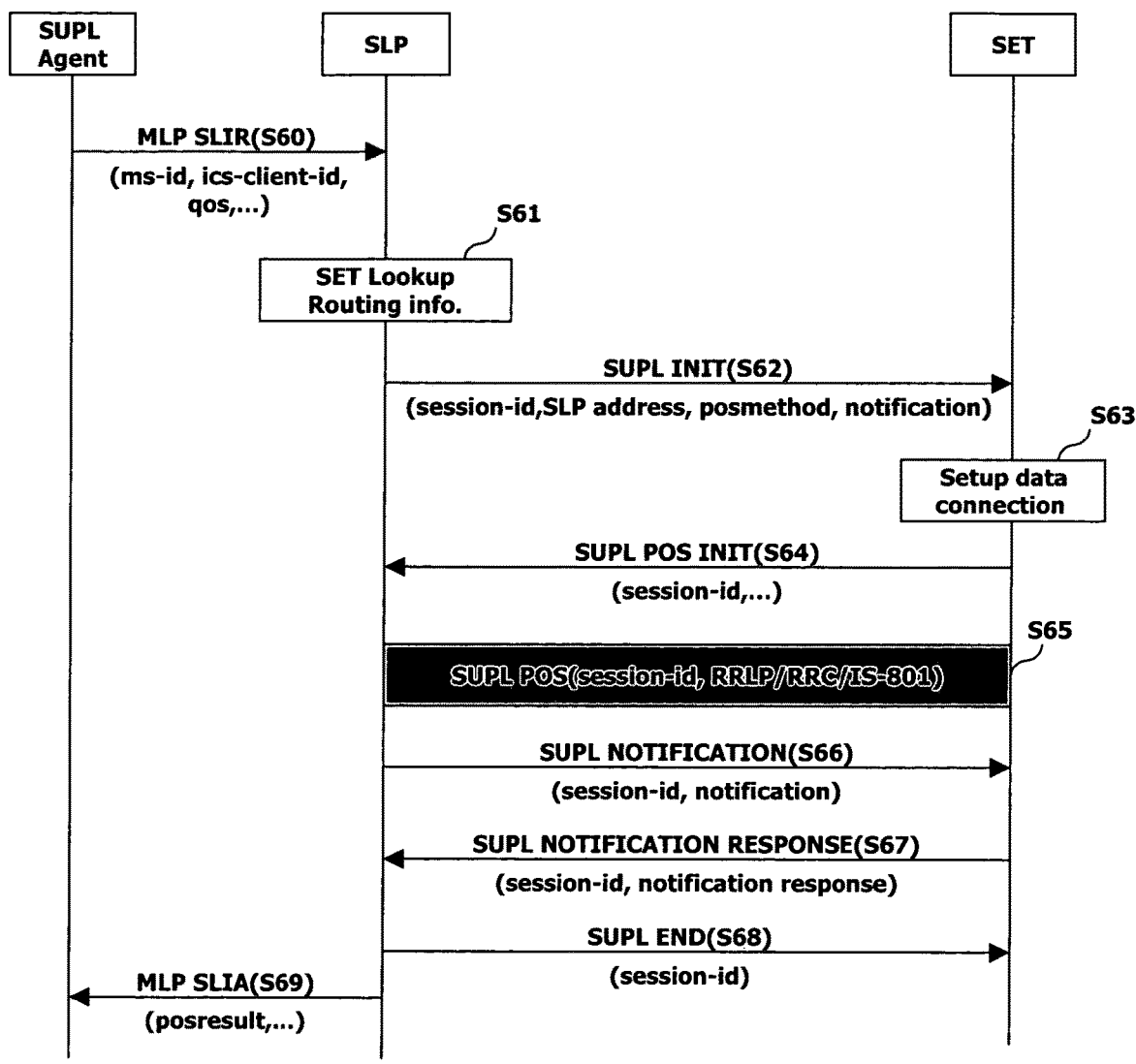
FIG. 6 illustrates a fourth embodiment of a user privacy management method in a mobile communications system according to the present invention.

FIG. 6 illustrates a user privacy management method of a mobile communications system according to a fourth embodiment of the present invention. In the fourth embodiment, a process for confirming a SUPL privacy in which the SUPL message is transmitted and received without any distinction between the Reduced Flow and the Extended Flow is explained. Referring to FIG. 6, a detailed explanation of those elements having the same reference numerals as those of FIG. 5 have been omitted to ensure that the features of FIG. 6 are not obscured.

As illustrated in FIG. 6, when the LCS agent requests the positioning of the SET to the SUPL agent within a network, the SUPL agent transfers the positioning request of the LCS client to the SLP through the MLP SLIR message (S60). The MLP SLIR message can include a ms-id, lcs-client-id, QoS, and the like.

The SLP checks whether the SUPL agent is authorized for location services on the basis of the received lcs-client-id, and then checks from the external PCE whether the LCS client is granted for the positioning on the basis of the ms-id and the lcs-client-id. As aforementioned, the SLP can perform these checking processes by requesting to the PCE or directly receiving the privacy information from the PCE.

Furthermore, the SLP determines whether the SET supports the SUPL using a SET look-up table, and, if necessary, the SLP confirms whether the SET currently belongs to a service region using routing information (S61).

Upon checking the SUPL agent authorization and permission for the positioning of the LCS client, the SLP transmits the SUPL INIT message to the SET, and initiates the SUPL positioning session with the SET (S62). At this time, when the positioning is set as 'conditionally grated' as in case 2 and case 4, on the basis of users and/or regions, the SLP includes the notification components in the SUPL INIT message. Accordingly, the SLP can query to the SET user as to whether to grant permission for positioning (in particular, a query based on regions can further be performed upon receiving privacy information). The SUPL INIT message can include a session-id, SLP address, positioning method (posmethod), and the like.

When the SUPL INIT message is received from the SLP, the SET is connected to a packet data network (e.g., a 3GPP or 3GPP2 network) when data connection is currently not opened (set) to any network (data connection setup) (S63). The SET then transmits the SUPL POS INIT message including the positioning authorization of the SET user to the SLP, to thus initiate a positioning protocol session with the SLP (S64). The SUPL POS INIT message may include at least a session-id, SET capabilities and location identifier (lid). The SET capabilities may include location measuring methods (e.g., MS assist A-GPS, MS based AGPS, and cell-id method) and associated location measuring protocols (e.g., RRLP, RRC, and IS-801). Also, the SET can further provide NMR for radio (wireless) technologies (e.g., GSM: TA, and RXLEV) to be used.

When the SUPL POS INIT message is received from the SET, the SLP examines the SUPL POS INIT message and recognizes the positioning authorization of the SET user, thereby determining which location measuring protocol (RRLP, RRC, and IS-801) should be used. Therefore, the SLP starts the SUPL positioning process according to the SUPL POS INIT message. The SLP or the SET sequentially exchanges SUPL positioning process messages (RRLP, RRC, and IS-801) several times, using the SUPL POS message (S65). In the SUPL positioning process, the location is calculated on the basis of measurements that the SLP has received from the SET (MS assisted), or assistance that the SET has obtained from the SLP (MS based). At this time, when the SET calculates its location, the location can be calculated by a location sensor mounted within the SET (e.g., a location calculating unit by GPS or Cell-id).

When the positioning process is completed, the SLP checks whether to grant permission for positioning of a user who has requested the positioning on the calculated location of the SET, by requesting an additional checking to the PCE or by using privacy information received from the PCE. According to the checked result, for cases 1, 2, and 3 in [Table 1], the SLP transfers the calculated location of the SET to the SUPL agent through the MLP SLIA message, while, for case 4, the SLP transmits the SUPL NOTIFICATION message to the SET to query again whether to transmit the location, thereafter transferring the location to the SUPL agent (S66 to S69).

Figure 7:
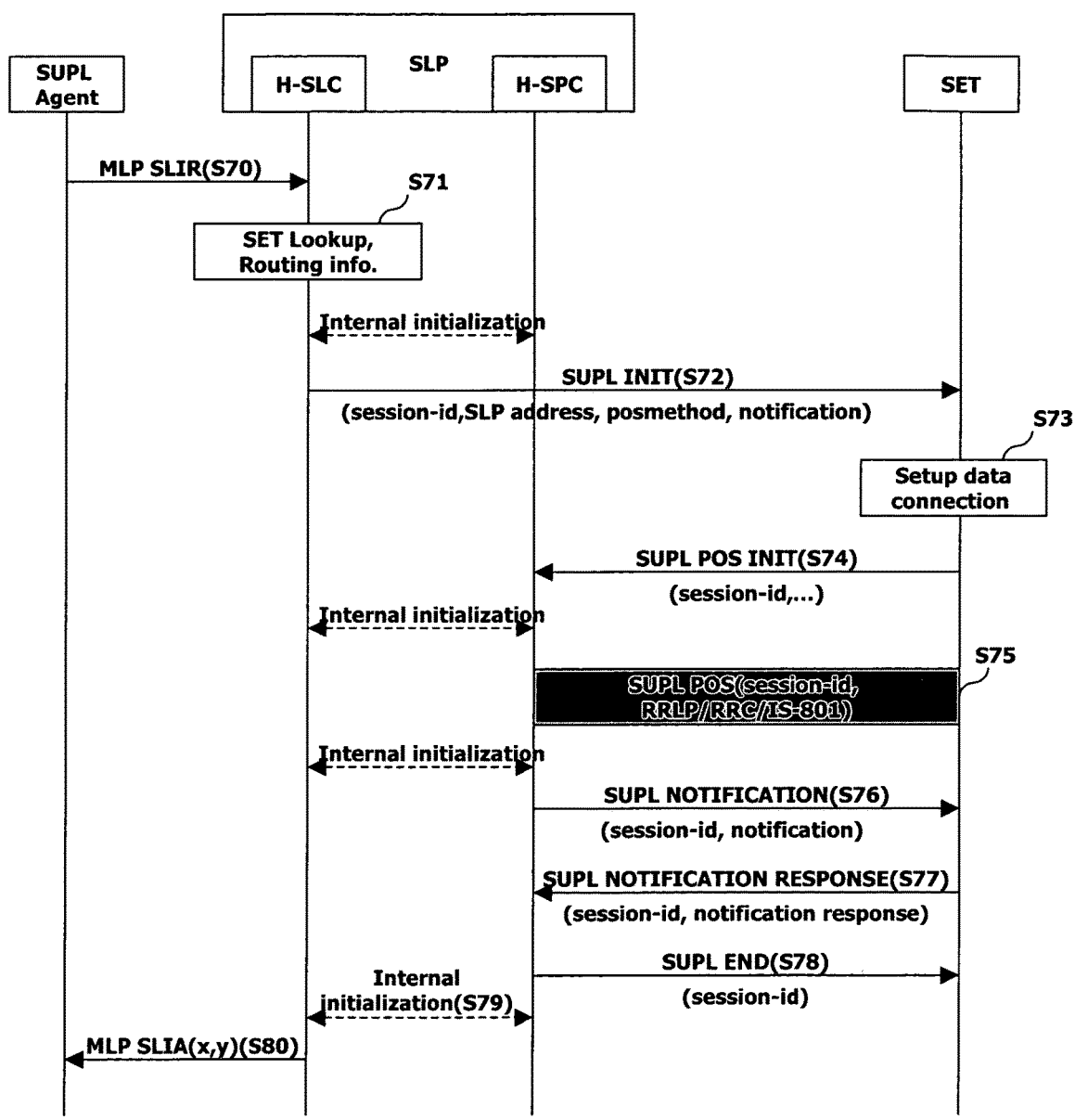
FIG. 7 illustrates a fifth embodiment of a user privacy management method in a mobile communications system according to the present invention.

FIG. 7 illustrates a user privacy management method according to a fifth embodiment of the present invention.

The fifth embodiment of the present invention shows a SUPL message transmission process for a case of performing a privacy management by dividing the SLP (Home SLP) into a SUPL Location Center (SLC) and a SUPL Positioning Center (SPC) according to their functional aspects. The SLP, as a network component, may include a SPC which is an entity for calculating an actual location and a SLC for managing other functions of the SLP excluding the function for calculating location information, for instance, roaming, resource managing, and the like.

That is, the fifth embodiment corresponds to an example in which the SLP is divided into the SPC for calculating a location by exchanging messages with the actual SET, and the SLC for performing other functions of the SLP excepting the function for calculating the location information, so that the SPC performs the positioning process directly with the SET and an information transfer between the SPC and the SLC is performed through an internal communication.

Referring to FIG. 7, when the LCS client requests positioning of a terminal to the SUPL agent within the network, the SUPL agent transfers the positioning request to the H-SLC (Home-SLC) through the MLP SLIR message (S70). The MLIP SLIR message includes a ms-id, Ics-client-id, qos, and the like.

The H-SLC authorizes the SUPL agent according to the received Ics-client-id and checks a user privacy for the Ics-client-id according to the ms-id, that is, checks whether to grant permission for positioning for the LCS client from the external PCE. The SLP, as aforementioned, can perform these checking processes by requesting to the PCE or directly receiving privacy information from the PCE. In addition, the SLC determines whether the SET supports the SUPL using a SET look-up table. If necessary, the SLC checks whether the SET currently belongs to a service region using routing information (S71). When these series of operations are completed, the H-SLC notifies the H-SPC of the privacy information and of which the SUPL POS process preparation is to be initiated through an internal initialization with the H-SPC (S72).

Upon checking of the SUPL agent authorization and whether to grant permission for positioning of the LCS client, the H-SLC transmits the SUPL INIT message to the SET to thusly initiate the SUPL session with the SET (S73). Here, the H-SLC includes the notification components in the SUPL INIT message for transmission according to the privacy information (case 2 and case 4). The SUPL INIT message can include a session-id, SLP address, positioning measuring method (posmethod), and the like.

When the SUPL INIT message is received from the H-SLC of the SLP, if a data connection is not currently opened (e.g., set) even to any network, the SET is connected to a packet data network (i.e., a 3GPP or 3GPP2 network) (data connection setup) (S74). The SET then estimates (approximates) various notification rules and thus transmits the SUPL POS INIT message to the H-SPC of the SLP for taking an appropriate action, namely, initiating the positioning session (S75). The SUPL POS INIT message may include at least a session-id, SET capabilities, and location identifier (lid). The SET capabilities include supported location-measuring methods (e.g., MS assist A-GPS and MS based A-GPS, and cell-id method) and associated location-measuring methods (e.g., RRLP, RRC, and IS-801). Also, the SET may further provide NMR for radio technologies (e.g., GSM:TA and RXLEV) to be used.

When the SUPL POS INIT message is received from the SET, the H-SPC examines the SUPL POS INIT message so as to determine which location measuring protocol (RRLP, RRC, and IS-801) should be used. The H-SPC then checks whether the location identifier (lid) satisfies the QoS (Quality of Service) required from the SUPL agent. If the lid satisfies the QoS required from the SUPL agent, the H-SPC immediately performs the operations after the step (S78) without performing the positioning process (SUPL POS). If the lid does not satisfy the QoS, the H-SPC sequentially exchanges the positioning process messages (RRLP/RRC/TIA-801) with the SET several times to thusly perform the positioning process (S77).

Therefore, the H-SPC or SET calculates the location of the SET through the SUPL positioning process messages for the positioning. The location of the SET can be calculated on the basis of measurements that the SLP has received from the SET (MS Assisted), or through assistance that the SET has obtained from the SLP (MS based). At this time, when the SET calculates the location thereof, the location can be calculated by a location sensor mounted in the SET (e.g., location calculating unit by GPS or Cell-id).

When the location of the SET is completely calculated, the H-SPC checks whether to grant permission for positioning of the user having requested the positioning on the calculated location of the SET, by requesting an additional checking to the PCE or using privacy information received from the PCE. Therefore, according to the checked result, the H-SPC transfers the calculated location of the SET directly to the H-SLC through an internal communication so as to be transferred to the SUPL agent (S78) (for case 1, 2, and 3), or transfers to the H-SLC through the internal communication after performing those steps of S79 to S81 (S83) (for case 4).

As described so far, when the privacy authorization is based on the actual location of a terminal, the terminal user is notified of application of the privacy setup for confirmation, so that the user privacy can effectively be managed in a more stable manner.

In addition, by dividing the SLP for managing the positioning into SPC and SLC, the location calculating process is performed by directly connecting the SET and the SPC, which results in reduction of signaling in the related art SLC and facilitation of adding a new function (upgrade).

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A user privacy management method in a mobile communication system, the method comprising:
   receiving, by a Secure User Plane Location (SUPL) location platform (SLP) from a SUPL agent, a Mobile Location Protocol (MLP) Standard Location Immediate Request (SLIR) message as a first message, for a target terminal,
   wherein the MLP SLIR message comprises a request by the SUPL agent for a position of the target terminal, a SUPL agent client identification and a required quality of service (QoS);
   verifying, by the SLP, whether the target terminal is currently within a service area of the SLP using routing information and whether the target terminal supports a secure user plane location (SUPL) protocol using a Secure User Plane Location (SUPL) Enabled Terminal (SET) lookup table, the SUPL protocol being a protocol which uses a user plane data bearer to transfer positioning system assistance information;
   after verifying that the target terminal is currently within the service area of the SLP and that the target terminal supports the SUPL protocol, transmitting, by the SLP to the target terminal, a SUPL initialization (INIT) (SUPL INIT) message as a second message,
   wherein the SUPL INIT message comprises information related to a session-id, a positioning method and an address of the SLP that is used to establish a data connection by the target terminal;
   receiving, by the SLP from the target terminal, a SUPL position (POS) INIT (SUPL POS INIT) message as a third message,
   wherein the SUPL POS INIT message comprises information related to the session-id, target terminal capabilities and a location identifier (lid), the target terminal capabilities include positioning methods and positioning protocols associated with the positioning methods;

determining, at the SLP, whether the lid included in the SUPL POS INIT message does or does not meet the required QoS;

based on the SUPL POS INIT message, determining, at the SLP, a positioning method and a positioning protocol associated with the positioning method;

calculating, at the SLP, a location of the target terminal if the information included in the SUPL POS INIT message does not meet the required QoS;

after calculating the location of the target terminal, determining, by the SLP, whether a privacy of the target terminal indicates a SUPL NOTIFY message should be sent to the target terminal before sharing the calculated location with the SUPL agent;

if the SLP determines that the privacy of the target terminal indicates that the SUPL NOTIFY message should be sent to the target terminal before sharing the calculated location with the SUPL agent, transmitting by the SLP to the target terminal, the SUPL NOTIFY message as a fourth message different from the second message, wherein the SUPL NOTIFY message comprises a notification element to request permission from the target terminal to share the calculated location with the SUPL agent;

receiving at the SLP, from the target terminal, a SUPL NOTIFY RESPONSE message as a fifth message in response to the SUPL NOTIFY message, wherein the SUPL NOTIFY RESPONSE message comprises a notification response;

transmitting, by the SLP to the target terminal, a SUPL END message informing termination of location session as a sixth message, the SUPL END message is transmitted after the data connection setup is performed by the target terminal; and if the notification response includes a permission to share the calculated location with the SUPL agent, transmitting, by the SLP to the SUPL agent, a Mobile Location Protocol (MLP) Standard Location Immediate Answer (SLIA) message as a seventh message, in response to the MLP SLIR message, wherein the MLP SLIA message comprises the calculated location of the target terminal.

2. The method of claim 1, wherein the transmitting of the SUPL NOTIFY message is performed using a session initialization message or a session notification message.

3. The method of claim 1, wherein the transmitting of the SUPL NOTIFY message is performed through a session for calculating the location of the target terminal or through another new session.

4. The method of claim 1, wherein the determining whether the privacy of the target terminal indicates a SUPL NOTIFY message should be sent comprises:

requesting an external Privacy Checking Entity (PCE) to check whether the SUPL Agent is permitted to receive the calculated location; and receiving a response result from the PCE.

5. The method of claim 1, wherein the SUPL Agent is a user of the mobile communication system and the notification response of the SUPL NOTIFY RESPONSE message indicates a grant or deny of the request by the SUPL agent for the location of the target terminal.

6. A Secure User Plane Location (SUPL) location platform (SLP) for user privacy management method in a mobile communication system, the SUPL SLP comprising:

a transceiver; and a processor operatively connected to the transceiver and configured to receive, from a SUPL agent, a Mobile Location Protocol (MLP) Standard Location Immediate Request (SLIR) message as a first message, for a target terminal, wherein the MLP SLIR message comprises a request by the SUPL agent for a position of the target terminal, a SUPL agent client identification and a required quality of service (QoS);

verify whether the target terminal is currently within a service area of the SLP using routing information and whether the target terminal supports a secure user plane location (SUPL) protocol using a Secure User Plane Location (SUPL) Enabled Terminal (SET) lookup table, the SUPL protocol being a protocol which uses a user plane data bearer to transfer positioning system assistance information;

after verifying that the target terminal is currently within the service area of the SLP and that the target terminal supports the SUPL protocol, transmit, to the target terminal, a SUPL initialization (INIT) (SUPL INIT) message as a second message, wherein the SUPL INIT message comprises information related to a session-id, a positioning method and an address of the SLP that is used to establish a data connection by the target terminal;

receive, from the target terminal, a SUPL position (POS) INIT (SUPL POS INIT) message as a third message, wherein the SUPL POS INIT message comprises information related to the session-id, target terminal capabilities and a location identifier (lid), the target terminal capabilities include positioning methods and positioning protocols associated with the positioning methods;

determine whether the lid included in the SUPL POS INIT message does or does not meet the required QoS;

based on the SUPL POS INIT message, determine a positioning method and a positioning protocol associated with the positioning method;

calculate, at the SLP, a location of the target terminal if the information included in the SUPL POS INIT message does not meet the required QoS;

after calculating the location of the target terminal, determine whether a privacy of the target terminal indicates a SUPL NOTIFY message should be sent to the target terminal before sharing the calculated location with the SUPL agent;

if the privacy of the target terminal indicates that the SUPL NOTIFY message should be sent to the target terminal before sharing the calculated location with the SUPL agent, transmit, to the target terminal, the SUPL NOTIFY message as a fourth message different from the second message, wherein the SUPL NOTIFY message comprises a notification element to request permission from the target terminal to share the calculated location with the SUPL agent;

receive, from the target terminal, a SUPL NOTIFY RESPONSE message as a fifth message in response to the SUPL NOTIFY message, wherein the SUPL NOTIFY RESPONSE message comprises a notification response;

transmit, to the target terminal, a SUPL END message informing termination of location session as a sixth message, the SUPL END message is transmitted after the data connection setup is performed by the target terminal; and if the notification response includes a permission to share the calculated location with the SUPL agent, transmit, to the SUPL agent, a Mobile Location Protocol (MLP)

Standard Location Immediate Answer (SLIA) message as a seventh message, in response to the MLP SLIR message, wherein the MLP SLIA message comprises the calculated location of the target terminal.

* * * * *